United States Patent Office 2,832,613
Patented Apr. 29, 1958

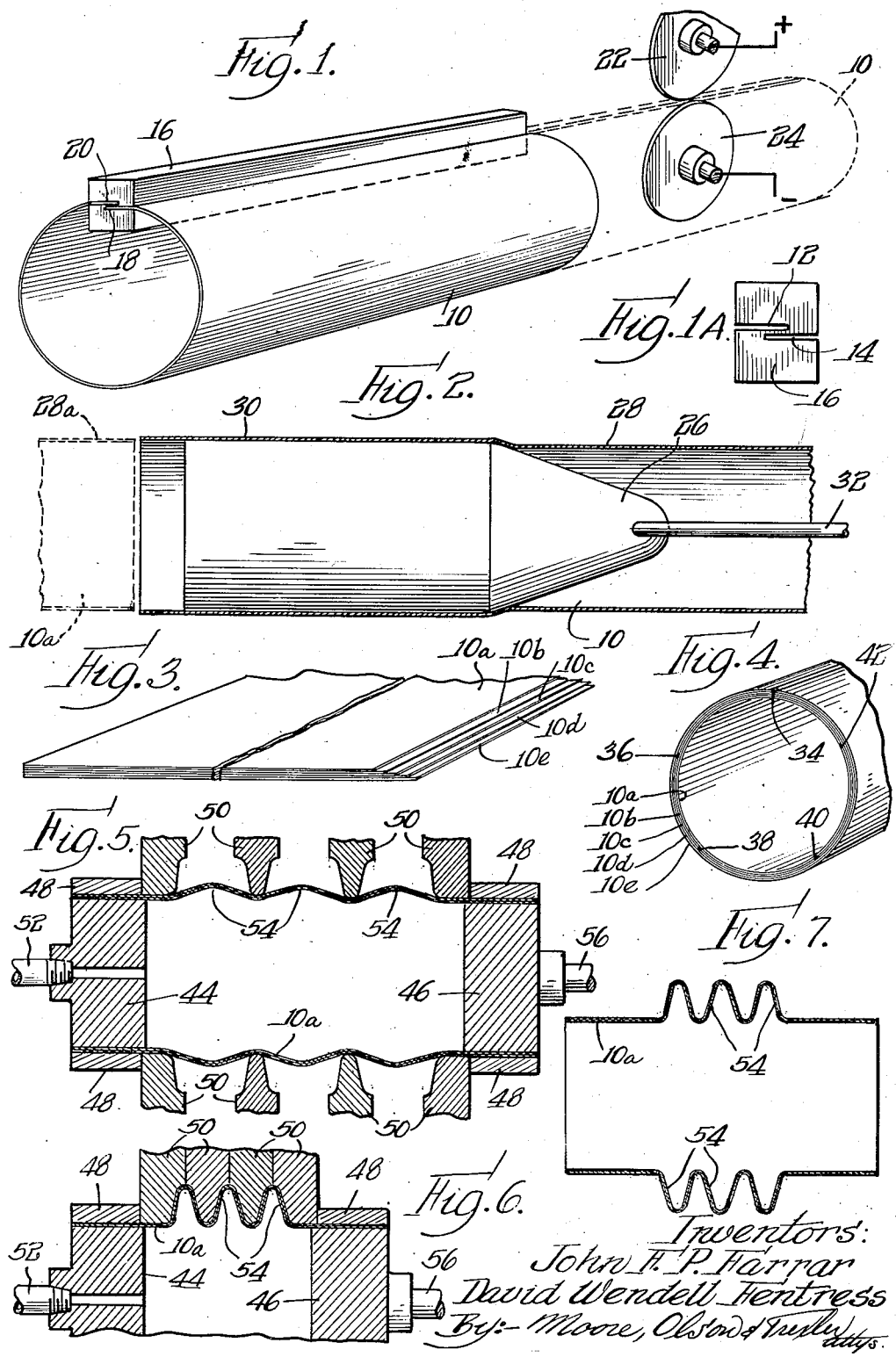

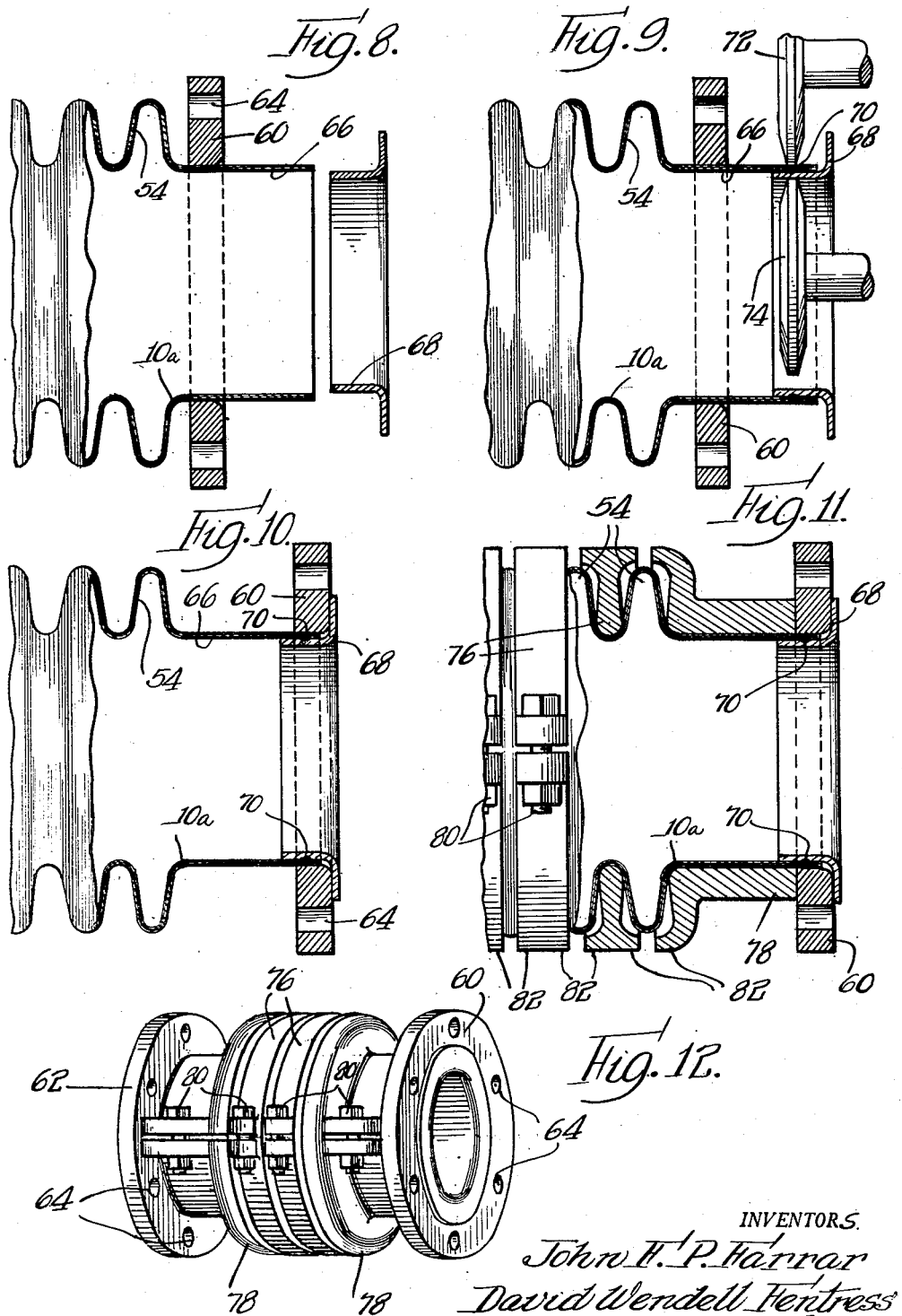

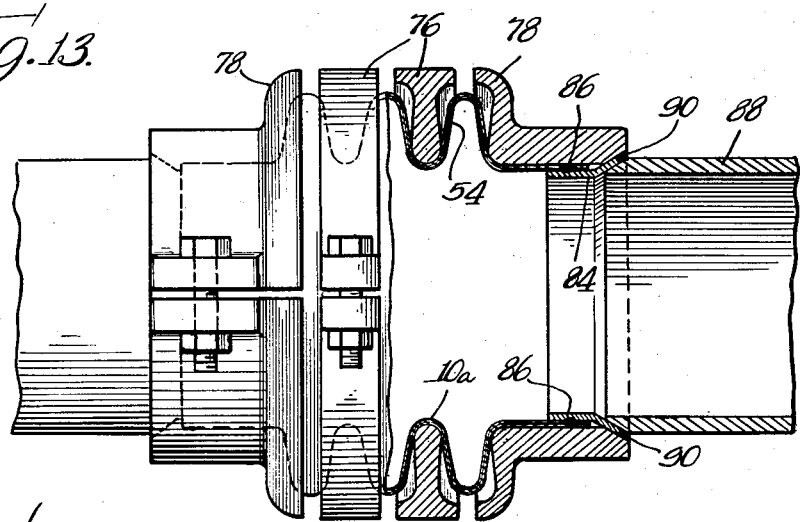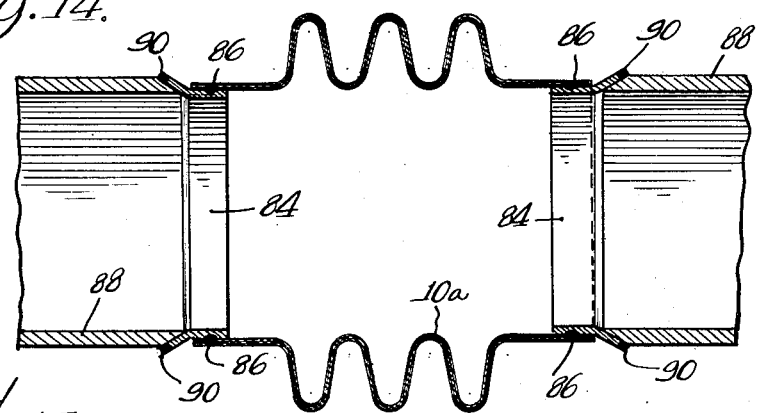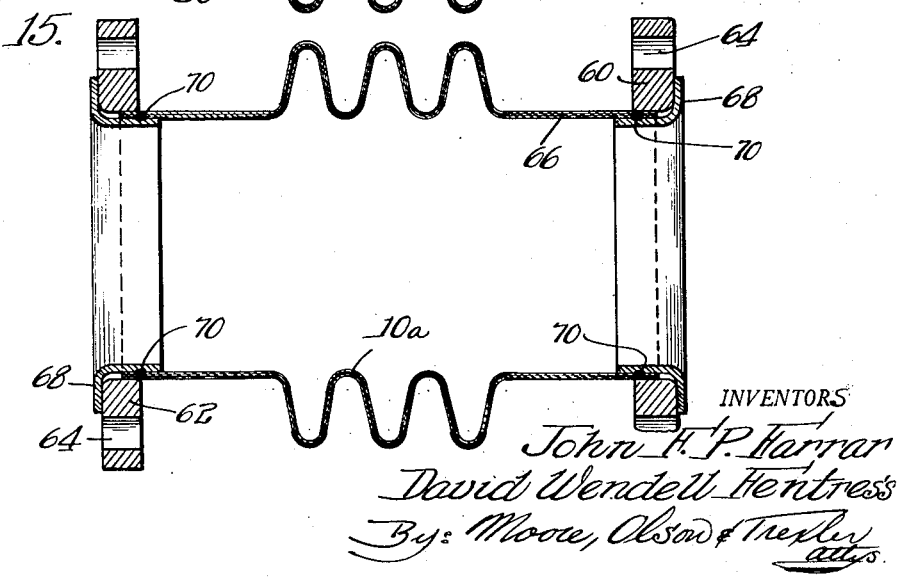

2,832,613

AUTOGENOUS WELDED LAMINATED EXPANSION JOINT FOR CONDUITS

John F. P. Farrar, Maywood, and David Wendell Fentress, Barrington, Ill., assignors to Flexonics Corporation, a corporation of Illinois Application June 10, 1954, Serial No. 435,695

6 Claims. (Cl. 285—226)

This invention relates to expansion joints of the type adapted for insertion into pipe lines and other conduits for the absorption of expansion, vibration, misalignment, and the like.

Expansion joints are employed in the pipe lines and other conduit connections for the absorption of expansion, vibration, and misalignment. Sizes commonly employed are from four inches to thirty inches in inside diameter, although in some installations smaller and larger sizes are employed.

Expansion joints are frequently called upon to absorb major degress of movement, in relation to their size or length, but ordinarily in such cases the required rate of movement, or cycling of operation over any predetermined period of time, is low.

In the past expansion joints have commonly been constructed of a single layer of metal forming the tube wall. As the joint flexes in service, for example in an installation wherein the joint is called upon to absorb expansion between conduits, each convolution of the joint may move as much as ½ of an inch or ¾ of an inch. Notwithstanding that the required rate of movement may not be great, considerable bending and forces of stress result, often leading to premature rupture and deterioration of the joint in service.

In accordance with the present invention the expansion joint is provided of a laminated wall construction, specifically a plurality of concentric laminations, and means and methods are provided for the production of such joints, in various required sizes, and for the suitable attachment of end fittings thereto, in accordance with the requirements of various service and operating conditions.

It is an object of the invention to provide an improved expansion joint, of improved operating characteristics.

More specifically stated, it is an object of the invention to provide an improved expansion joint of laminated wall construction, and to provide improved means and methods for effecting the fabrication of a structure of this character.

Further objects of the invention are to provide an improved expansion joint of the foregoing type which will be more durable in service, which will have increased flexibility in relation to its strength and pressure capacities, which is more leakproof, and which is more adaptable to various conditions of service and conducted fluid mediums with a minimum increase in cost.

A still further object of the invention is to provide, in an expansion joint of the foregoing type, improved end connections and assemblies, and improved means and methods for effecting their fabrication.

Various other objects, advantages and features of the invention will be apparent from the following specification when taken in connection with the accompanying drawings wherein certain preferred embodiments are set forth for purposes of illustration. This application is a continuation-in-part of an application, Serial No. 795,016, filed Dec. 31, 1947, now abandoned.

In the drawings, wherein like reference numerals refer to like parts throughout:

Fig. 1 is a perspective view, somewhat schematic in form, illustrating means and methods for effecting an initial step in the fabrication of the expansion joint of the present invention;

Fig. 1A is a detail view of a part of the apparatus shown in Fig. 1;

Fig. 2 is a longitudinal sectional view of a further step in effecting the fabrication of the joint body in accordance with one preferred method;

Fig. 3 is an illustrative view showing the means of fabrication in accordance with an alternate method;

Fig. 4 is a partial perspective view of the completed body, prior to corrugation;

Figs. 5 and 6 are illustrative views showing successive steps in the corrugating of the body, to impart flexibility;

Fig. 7 is a longitudinal sectional view of the completed expansion joint body, in accordance with the invention;

Figs. 8, 9 and 10 are views showing successive steps in the attachment of end fittings to the body, in accordance with one embodiment;

Fig. 11 illustrates the application of rings to the structure for flexing control;

Fig. 12 is a perspective view of the completed expansion joint, in accordance with one embodiment; and Figs. 13, 14 and 15 are generally similar views, illustrating modified forms of structure and fitting attachments.

Referring more specifically to the drawings, in Figs. 1 and 1A means and methods are shown for effecting the fabrication of one laminated wall portion of the expansion joint body. As shown, a sheet 10, of the metal of which the joint is to be constructed, and of appropriate size, is first bent into generally cylindrical shape with its ends fitted into the opposed slots 12 and 14 of an elongated fixture bar 16 having sufficient length to align and position the sheet ends. The slots 12 and 14 of the fixture bar are sufficiently wider than the thickness of the metal sheet 10, so that free sliding movement of the sheet longitudinally of the bar is permitted. As best shown in Fig. 1A, the bar slots 12 and 14 overlap laterally, and are separated vertically only a very slight distance so that the sheet ends 18 and 20 are superposed in substantially contacting relation when the sheet is in assembled position.

The fixture bar 16 is suitably supported by means, not shown, in juxtaposition to a pair of welding rollers 22 and 24 forming a part of a welding machine, of suitable construction, and adapted for connection with the opposite ends of the welding transformer secondary, as diagrammatically indicated by the electrical connections shown. As the sheet 10 is shifted longitudinally of the fixture bar, to the right as seen in Fig. 1, the superposed sheet edges 18 and 20 will be brought between the welding rollers, so that upon application of the welding current, a longitudinal seam resistance weld will be formed along the sheet edges so as to form the sheet 10 into a cylindrical body member, as shown.

In accordance with the methods of fabrication illustrated in Fig. 2, an expanding and calibrating plug 26 is then drawn through the body member 10 so as to expand it from its original cylindrical size, as indicated at 28, into a predetermined larger size as shown at 30. As will be understood, the body size 28 will be predetermined by the original size of the metal sheet, due to the fact that the overlap of the sheet edges 18 and 20 is accurately predetermined by the fixture bar 16. Accordingly the body size 28 may thus be accurately predetermined by a proper determination of the original sheet size of the body member.

The size 30 is determined by the cylindrical size of the expanding and calibrating plug. This size is predetermined so that the body member 10 will be expanded just sufficiently to permit the free insertion of another body member, as indicated at 10a in Fig. 2, having a size corresponding to the original size of the body member 10, and fabricated in a similar manner. The expanding and calibrating plug 26 may be drawn through the body 10, to effect the expansion thereof, by suitable means such as a cord or wire 32 connected to a power source.

After the assembly of the body 10a within the body 10, so as to form a laminated wall structure of double lamination, the expanding and calibrating plug 26 may be again drawn through the composite structure, and a further body member of the same original size again inserted, to provide a triple wall lamination. In this manner a laminated wall structure of a desired number of laminations, within limits, may be fabricated. It will be seen that each expanding operation expands the cylindrical bodies, one or more depending upon the number assembled, the same given distance; so that the same controlled degree of expansion is effected by each operation of the expanding plug.

While the foregoing method of fabrication is suitable for expansion joint bodies, in the smaller sizes, and having a smaller number of laminations, for increased sizes and increased numbers of laminations the method of fabrication as indicated in Fig. 3 may be preferred. In accordance with this method the various sheets of which the body is to be formed, as indicated in this instance as sheets 10a, 10b, 10c, 10d and 10e, are of progressively increased size, in accurately predetermined increments. As the sheets are successively formed into cylindrical body shape, in accordance with the methods illustrated in Fig. 1, each set of sheet edges having the same controlled degree of overlap, cylindrical bodies of successively increasing size will be fabricated. Preferably the increasing size is such that each body member may be just slipped into the next larger body member, whereby to build up a laminated body wall of the desired number of laminations. The completed body, as fabricated either by the method of Figs. 1 and 2 or the method of Figs. 1 and 3, is illustrated in Fig. 4. For uniformity of operation in service, the welded overlapped edges for each wall lamination are preferably displaced uniformly as indicated at 34, 36, 38, 40 and 42 in Fig. 4.

In accordance with the preferred methods herein disclosed, the multiple laminated body is next corrugated for flexibility, by means and methods as indicated in Figs. 5 and 6. The laminated wall structure, after assembly and in composite form, is mounted between a pair of end plates 44 and 46, and associated split clamps 48, Fig. 5, forming a part of a hydraulic corrugating machine. The machine further includes a plurality of split die plates 50 initially mounted in uniformly spaced, predetermined fixed position. Upon the introduction of liquid, under pressure, into the interior of the laminated body structure, by means of the conduit 52; coupled with the power propulsion of the plates 44 and 46 toward each other by suitable means, such as piston rod 56, a progressive corrugating of the body takes place as indicated at 54 in Figs. 5 and 6. During the corrugating operation the die plates 50 are released for free floating movement relatively toward each other while being constrained from lateral separation. When the formation of the corrugations 54 is completed, as shown in Fig. 6, the die plates 50 are brought into abutting relation, and the body corrugations are formed to a pitch and contour as determined by the contours and size of the die plates. The completed corrugated body, as thus fabricated, is illustrated in Fig. 7.

Means and methods for assembling end fittings onto the laminated body, in accordance with one embodiment, are illustrated in Figs. 8, 9 and 10. Expansion joints, particularly in the larger sizes, are frequently interconnected with pipe lines and conduits of rugged heavy duty construction, and within which large forces of expansion and vibration may be generated. Such installations require heavy duty end fittings on the expansion joint, for interconnection with the conduits, so as to provide a rugged yet leakproof connection. The provision of a laminated wall expansion joint presents the problem of securing a heavy duty end fitting to the relatively frangible and thin laminations of the body wall section.

As illustrated in Figs. 8–12, the end fittings for the expansion joint comprise a pair of relatively heavy duty flange members 60 and 62 of the type adapted for cooperation with similarly formed flange members on the end of the connecting pipe conduits, the flange members being provided with circumferentially spaced openings 64 for receiving the securing bolts.

As shown in Figs. 8–10, wherein the securing of the flange member 60 is illustrated, it will be seen, Fig. 8, that such flange member is first slipped over the extending neck portion 66 of the laminated body, away from the end thereof, after which an adapter collar as indicated at 68 is inserted internally of the body end. This adapter collar is preformed, of suitable size and shape, and is of single wall thickness.

After insertion of the adapter, a circular seam resistance weld between the adapter and the body end is formed, as indicated at 70, Fig. 9, by means of a pair of welding rollers 72 and 74 adapted to cooperatively grip the parts and to be shifted relatively circumferentially thereof, as for example by suitably rotating the expander body between the welding rollers after the adapter member has been applied. After the formation of the circular seam resistance weld, the fitting 60 is moved to operative position, as shown in Fig. 10.

The circular weld 70 not only secures the adapter 68 into position, but also welds the several laminations of the expander body together in a fluid-tight joint, so that should one lamination become ruptured or leak in service, the leakage thus resulting will be localized to the defective wall lamination, and an effective fluid-tight seal maintained by the remaining wall laminations of the expander body structure. The mass of the adapter 68 though greater than the mass of the individual body laminations, is no so disproportionate as to preclude effective resistance seam welding; and is considerably less than the mass of the flange member 60 which is proportioned to the stress requirements of the installation. The thickness of the adapted 68 is selected to assure effective welding to the laminated body without damaging the laminations. To this end the adapter should probably not be greater than three times the thickness of the laminated body but generally runs around twice the thickness and may approximate the thickness of the laminated body. Such thicknesses do not require the excessive heating which would tend to damage the laminations. Assuming an individual lamination to have a thickness of approximately .020 inch, a three-ply body would approximate .060 inch in thickness. With an adapter three times as thick as the composite body, that is, .180 inch, the adapter would be approximately nine times as thick as an individual lamination. However, this ratio is still substantially less than that of the more massive mounting element 60, and the conduit 88 of Fig. 14, referred to hereinafter. The adapter member, being preformed, avoids hammering and forming operations after application to the laminated body, so as to preclude danger of injury to the frangible laminated wall section ends.

As shown in Fig. 11, split rings may be applied to the structure so as to insure controlled flexing of the laminated expander body, in service. As shown in Figs. 11 and 12, these rings comprise a series of intermediate rings 76 disposed between the convolutions 54, and shaped to conform to the contours thereof; and a pair of end rings 78 shaped to conform to and sized in accordance with the extending neck portions of the laminated expander body. Bolts, as indicated at 80, are provided for holding the rings in assembled position. By means of the rings thus provided, a controlled flexing of the expansion joint or expander unit is insured, in that the rings preclude the undue collapsing movement of any one convolution, in operation, to the exclusion of the others. More particularly, as the expansion joint is collapsed, the flange portions of the rings are ultimately brought into abutting engagement to prevent undue collapsing movement of any convolution. Such controlled flexing equalizes stresses applied to the convolutions and increases durability of the unit in service.

In Fig. 13 an embodiment is illustrated, employing control rings as previously described, but wherein a different form of and connection for the expander unit is provided. In this instance the preformed adapter member 84, corresponding in function and purpose with the adapter member 68 previously described, is circular seam resistance welded to the extending neck portion of the expander body, as indicated at 86; such circular seam resistance weld also acting to seal the several laminations of the body wall together in a series of fluid-tight pocket sections between the laminations. The adapter member, being of relatively heavier wall section than the individual body laminations, may be readily welded to the conduit end 88 by means of a circular weld 90 which may be either an arc weld or a circular seam weld, as desired, and as may best be formed in accordance with the requirements of the particular installation. The rings 76 and 78, for controlled flexing, may be applied to the unit after the welding operations, as in the embodiment of the invention previously described.

In Figs. 14 and 15 expansion joints are illustrated, corresponding respectively with the joints of Figs. 11 and 13, with the rings for controlled flexing not provided. The free flexing units of Figs. 14 and 15 may in certain instances be desired.

The laminated wall expansion joint provided by the present invention gives increased flexibility in relation to the strength and pressure capacity of the expander; due to the fact that the strength and pressure capacity varies in accordance with the composite wall thickness, whereas resistance to flexing varies substantially as the cube of the thickness of the individual laminations multiplied by the number of laminations provided. Furthermore, the degree of movement of the convolutions, in the instance of a laminated wall, is considerably greater before a stretching of any metal fibers beyond their elastic limit occurs; so that a large degree of movement may be provided by the expander, but without stress of any of the metal fibers of the laminated wall beyond their elastic limit. Longer life and greater durability in service is thus provided. The several wall laminations, being individually sealed at their ends, provide a multiple barrier for fluid tightness.

In accordance with the invention, the various laminations of the body wall are selected as to metal, in accordance with the requirements of the installation. For example, if a corrosive fluid is to be conducted, the innermost wall lamination will be selected of a metal resistant to the corrosive action of the particular fluid involved. If dissipation of heat is simultaneously a factor, the other body laminations are selected with a view toward conduction and radiation of heat from the unit. In this way the unit is adapted to the particular service requirements of the installation, with a minimum of over-all cost.

It is obvious that various changes may be made in the specific embodiments set forth without departing from the spirit of the invention. The invention is accordingly not to be limited to the specific embodiments shown and described, but only as indicated in the following claims.

We claim:

1. An expansion joint for connection in a conduit line for absorbing expansion, contraction, vibration, misalignment and the like therein; and comprising a convoluted expander body of a metallic laminated thin wall structure including laminate annular end portions, means for securing the end portions in the conduit line and including an adapter member telescoped with an adjacent end portion of the expander body and annularly welded thereto by a continuous autogenous weld located within the extremities of the telescoped surfaces between the end portion of the expander body and the adapter member and securing together the individual wall laminations of the end portions of the expander body and the telescoped portion of the adapter member, said adapter member comprising an annulus having a thickness materially greater than the thickness of the individual wall laminations of the expander body and within the range of substantially the composite thickness of the laminated wall structure of the end portion and a thickness approximating three times the said composite thickness of the laminated wall structure whereby to provide a welded joint between the end portion of the expander body and the telescoped adapter member for withstanding stresses incident to movements of the expander body in the conduit line while precluding damage to the wall laminations during welding, said adapter member having a portion thereof extending outwardly from the telescoped end of the expander body, and an annular end fitting more massive than said adapter member and cooperating with the outwardly extending portion of the adapter member for supporting the expander body in the conduit line.

2. An expansion joint as claimed in claim 1, wherein the end fitting comprises a relatively massive annular mounting ring abutting the outwardly extending portion of the adapter member, and wherein there are provided intermediate reinforcing rings around the convolutions of the expander body and an end reinforcing ring interposed between the mounting ring and the adjacent intermediate reinforcing ring and substantially overlying the remaining portion of the end portion of the expander body.

3. An expansion joint as claimed in claim 1, wherein the end fitting is separately welded to the outwardly extending portion of the adapter member, and wherein there are provided intermediate reinforcing rings around the convolutions of the expander body and an end reinforcing ring substantially overlying the end portion of the expander body with the outer end thereof disposed adjacent the separate welded connection between the adapter member and the end fitting.

4. An expansion joint as claimed in claim 1, wherein the adapter member is preformed to include a substantially cylindrical portion telescoped with the end portion of the expander body and a free end portion disposed radially outwardly of the cylindrical portion and adapted for association with the end fitting.

5. An expansion joint as claimed in claim 1, wherein the end fitting embraces the end portion of the expander body in the vicinity of the welded connection between said end portion and the adapter member.

6. An expansion joint as claimed in claim 1, wherein the end fitting comprises a conduit member separately welded to the outwardly extending portion of the adapter member.

References Cited in the file of this patent

UNITED STATES PATENTS

| | | |
|---|---|---|
| 979,460 | Fulton | Dec. 27, 1910 |
| 1,505,121 | Allport | Aug. 19, 1924 |
| 1,797,151 | Lord | Mar. 17, 1931 |
| 1,835,314 | Lord | Dec. 8, 1931 |
| 2,207,146 | Fentress et al. | July 9, 1940 |
| 2,263,714 | Bloomfield et al. | Nov. 25, 1941 |
| 2,330,039 | Feenstra | Sept. 21, 1943 |
| 2,337,038 | Fentress | Dec. 21, 1943 |

(Other references on following page)

UNITED STATES PATENTS

| | | | |
|---|---|---|---|
| 2,337,247 | Kepler | | Dec. 21, 1943 |
| 2,349,792 | Rosenblad | | May 23, 1944 |
| 2,351,416 | Fentress | | June 13, 1944 |
| 2,365,181 | Fentress | | Dec. 19, 1944 |
| 2,414,987 | Tobey et al. | | Jan. 28, 1947 |
| 2,420,153 | Sprenger | | May 6, 1947 |
| 2,444,988 | Guarnaschelli | | July 13, 1948 |
| 2,445,484 | Kopperman | | July 20, 1948 |
| 2,470,167 | Hobbs | | May 17, 1949 |
| 2,489,844 | Zallea | | Nov. 29, 1949 |
| 2,565,184 | Parlasca | | Aug. 21, 1951 |

FOREIGN PATENTS

| | | |
|---|---|---|
| 591,635 | Great Britain | Aug. 25, 1947 |
| 262,058 | Switzerland | Sept. 16, 1949 |